Patented Nov. 15, 1927.

1,649,366

UNITED STATES PATENT OFFICE.

JOHN SEWARD POTTER, OF DENVER, COLORADO, ASSIGNOR TO THE S. W. SHATTUCK CHEMICAL COMPANY, OF DENVER, COLORADO, A CORPORATION OF COLORADO.

PROCESS OF TREATING CLAYS TO ADAPT THEM FOR DECOLORIZING AND DEODORIZING OILS.

No Drawing. Application filed August 15, 1925. Serial No. 50,522.

This invention relates to the production from clays, of material for decolorizing, deodorizing and deflavoring oils and its principal object resides in producing a material of this character which after it has performed its function in the decolorizing treatment of oils and fats, can be reclaimed or revivified to its original absorbent power and efficiency.

With the above object in view my invention resides not only in the material and the process for its production but also in the method of revivifying the material after use.

The process of producing the material consists in first mixing a clay ground to suitable fineness with from twenty per cent to fifty per cent (20% to 50% by weight of sulfuric acid of at least sixty degrees (60°) Baumé and heating the mixture for the formation of sulfates of the metals present in the composition and in this respect the process resembles that disclosed in my application for Patent No. 729,980, filed August 4, 1924, with which the present application is a continuation-in-part.

The new process differs, however, from the other in that the mixture of comminuted clay and sulfuric acid is heated to a temperature sufficiently high to completely decompose the greater portion of the sulfates formed by the chemical reaction of the sulfuric acid, and to stabilize and pectize the silicate so that it will retain its original form and consistency upon subsequent recalcination.

Stabilizing the silica by heating to a high temperature is a very important feature of the present invention, since because of this step the silica can be reclaimed after use; in fact it may be reclaimed many times because of this.

The decomposed sulfates are separated and removed from the silicic acid by leaching the product of the first step of the process with a suitable solvent, recovering the residue by filtration, and subsequently washing and drying the same as may be required to obtain a product of the peculiar absorptive property which particularly adapts it for the deodorization and decolorization of oils and fats. While the process may be successfully applied for the production of a reclaimable decolorizing agent from practically all clays, it is particularly adapted for the treatment of clays containing at least twenty per cent to thirty per cent (20% to 30%) alumina ($Al_2O_3$) and it is with reference to a clay of this character that the process will further be described.

The temperature to which the mixture of comminuted clay and sulfuric acid is heated ranges from seven hundred and seventy to one thousand degrees (770 to 1000°) centigrade according to the nature of the clay but it can, under no condition, be less than six hundred degrees (600°). For the reason of mechanical expediency and convenience, it is preferred to conduct the heating step in two stages in order to subject the mixture to a preliminary heat of up to six hundred degrees (600°) to decompose the clay into aluminum sulfates and silicic acid and then continue the calcination until a substantially complete decomposition of the sulfates is attained. The decomposition of the aluminum sulfate results in the production of aluminum oxide ($Al_2O_3$) and sulfuric anhydrite ($SO_3$) the latter being driven off by distillation in the form of sulfuric fumes. The silica in the composition is as stated before stabilized by the high temperature to a degree which causes it to retain its original structure and physical properties upon subsequent recalcination, and nothing remains but to separate and remove the aluminum oxide ($Al_2O_3$) and other impurities by solution and filtration. Best adapted for the solution of the aluminum oxides, are the mineral acids while for reasons of economy and practicability in use hydrochloric acid (HCl) is preferred.

The amount of hydrochloric acid used is calculated to form $AlCl_3$ in solution which is subsequently filtered off and one thousand pounds (1000 lbs.) of nineteen degree (19°) acid containing approximately twenty-nine per cent (29%) HCl per ton of raw clay has been found to produce satisfactory results. It is, however, apparent that the amount of the acid solvent must necessarily be varied in ratio to the percentage of alumina in the clay.

After the residue of the leaching action has been washed and dried, it forms a fine impalpable powder of high absorptive quality peculiarly adapted for the deodorization and decolorization of the oils and fats.

It is to be understood that the temperature to which the mixture of clay and sulfuric acid is heated should not approach that at which the silicic acid and alumina can fuse and one thousand degrees (1000°) centigrade may be considered as being the maximum heat at which the sulfates are completely decomposed and the silica is stabilized without danger of re-fusing.

After a product of the hereinabove described process has been used for the decolorization of oils to a point of saturation, it is reclaimed for renewed use by re-heating it to about the same temperature required in its original production, and this revivifaction by calcination may be accomplished repeatedly without detraction from the physical properties and absorptive power of the product. It is evident that by heating the saturated absorptive powder to a high temperature, the oil, carbon and other impurities contained in its pores are driven off by volatilization while owing to the stabilized and pectized condition of the powder its body-portions remain in their original condition.

Having thus described my invention, what I claim and desire to secure by Letters Patent is:

1. The method of treating clays for decolorizing and deodorizing oils consisting in heating a clay mixed with sulfuric acid, to a temperature at which the greater portion of the sulfates of metals in the clay are decomposed and sulfuric fumes are driven off, and removing hydrochloric acid soluble substances.

2. The method of treating clays for decolorizing and deodorizing oils consisting in heating a clay mixed with from twenty to fifty per cent (20 to 50%) of sulfuric acid of at least sixty per cent (60%) Baumé, to a temperature at which the greater portion of the sulfates of metals in the clay are decomposed and sulfuric fumes are driven off, and removing hydrochloric acid soluble substances.

3. The method of treating clays for decolorizing and deodorizing oils consisting in heating a clay mixed with from twenty to fifty per cent (20 to 50%) of sulfuric acid of at least sixty per cent (60%) Baumé, to a temperature of between seven hundred and seventy and one thousand degrees (770° and 1000°) centigrade, and removing hydrochloric acid soluble substances.

4. The method of treating clays for decolorizing and deodorizing oils consisting in heating a clay mixed with sulfuric acid to a temperature of from seven hundred and seventy to one thousand degrees (770° to 1000°) centigrade, and leaching the product with a mineral acid.

5. An agent for decolorizing and deodorizing oils consisting of the absorptive silica of a clay stabilized by heat to a condition for revivification after use by recalcination.

6. The method of reclaiming an agent for decolorizing and deodorizing oils, produced by heating a clay mixed with sulfuric acid to a temperature at which the greater portion of the sulfates of metals in the clay are decomposed, and recovering the silica from the product, consisting in recalcining the agent for the removal by evaporation of absorbed matter.

7. The method of reclaiming an agent for decolorizing and deodorizing oils, produced by heating a clay mixed with sulfuric acid to a temperature by which the greater portion of the sulfates of metals in the clay are decomposed, and recovering the silica from the product, consisting in reheating the agent to approximately the same temperature for the removal by evaporation of absorbed matter.

8. The method of reclaiming an agent for decolorizing and deodorizing oils, produced by heating a clay mixed with sulfuric acid to a temperature of between seven hundred and seventy and one thousand degrees (770° and 1000°) centigrade and recovering the silica from the product, consisting in re-heating the agent to approximately the same temperature for the removal by evaporation of absorbed matter.

9. The method of treating clays for decolorizing and deodorizing oils consisting in heating a clay mixed with sulfuric acid to a temperature of from seven hundred and seventy to one thousand degrees (770° to 1000°) centigrade, and removing hydrochloric-acid soluble substances.

In testimony whereof I have affixed my signature.

JOHN SEWARD POTTER.